(12) United States Patent
Vassel

(10) Patent No.: US 6,669,003 B2
(45) Date of Patent: Dec. 30, 2003

(54) TRANSPORT DIVERTER FOR PLATE MATERIAL CONVEYOR, PARTICULARLY A PLATE GLASS CONVEYOR

(75) Inventor: Donald T. Vassel, Newnan, GA (US)

(73) Assignee: Grenzebach Maschinenbau GmbH, Asbach-Bäumenheim/Hamlar (DE)

( * ) Notice: Subject to any disclaimer, the term of this patent is extended or adjusted under 35 U.S.C. 154(b) by 0 days.

(21) Appl. No.: 10/190,657

(22) Filed: Jul. 9, 2002

(65) Prior Publication Data

US 2002/0175043 A1 Nov. 28, 2002

Related U.S. Application Data

(63) Continuation-in-part of application No. PCT/DE01/04057, filed on Oct. 30, 2001.

(30) Foreign Application Priority Data

Oct. 30, 2000 (DE) .......................................... 100 53 852

(51) Int. Cl.[7] .............................................. B65G 47/26
(52) U.S. Cl. ................................... 198/435; 198/463.3
(58) Field of Search ............................... 198/435, 463.3

(56) References Cited

U.S. PATENT DOCUMENTS

| | | | | | |
|---|---|---|---|---|---|
| 2,693,135 A | * | 11/1954 | Frost | ........................... | 198/435 |
| 2,856,055 A | * | 10/1958 | Moss et al. | .................. | 198/435 |
| 3,734,264 A | * | 5/1973 | Stumpf | ..................... | 198/463.3 |
| 4,016,969 A | * | 4/1977 | Brand | ......................... | 198/435 |
| 4,867,299 A | * | 9/1989 | Fukuoka et al. | ............. | 198/435 |
| 5,205,394 A | * | 4/1993 | Zeuschner | .................. | 198/369 |
| 5,284,252 A | * | 2/1994 | Bonnet | ........................ | 209/552 |
| 5,692,593 A | * | 12/1997 | Ueno et al. | ............... | 198/369.2 |
| 5,909,796 A | * | 6/1999 | Soldavini | .................. | 198/369.2 |
| 6,357,985 B1 | * | 3/2002 | Anzani et al. | .............. | 198/435 |
| 6,523,668 B2 | * | 2/2003 | Wolz | ........................ | 198/369.2 |

FOREIGN PATENT DOCUMENTS

JP  2-66020  *  8/1988  .................. 198/435

* cited by examiner

Primary Examiner—Douglas Hess
(74) Attorney, Agent, or Firm—K. Bach

(57) ABSTRACT

In a transport diverter for diverting plate material from a supply conveyer to take-off conveyor branches, the transport diverter comprises a series of short conveyor segments, which can be raised in unison for the transfer of a plate from the supply conveyor to a conveyor takeoff branch, which extends at a higher level than the supply conveyer, and which can subsequently be lowered individually one after the other to the level of the supply conveyor as the plate moves off the conveyor segments.

1 Claim, 2 Drawing Sheets

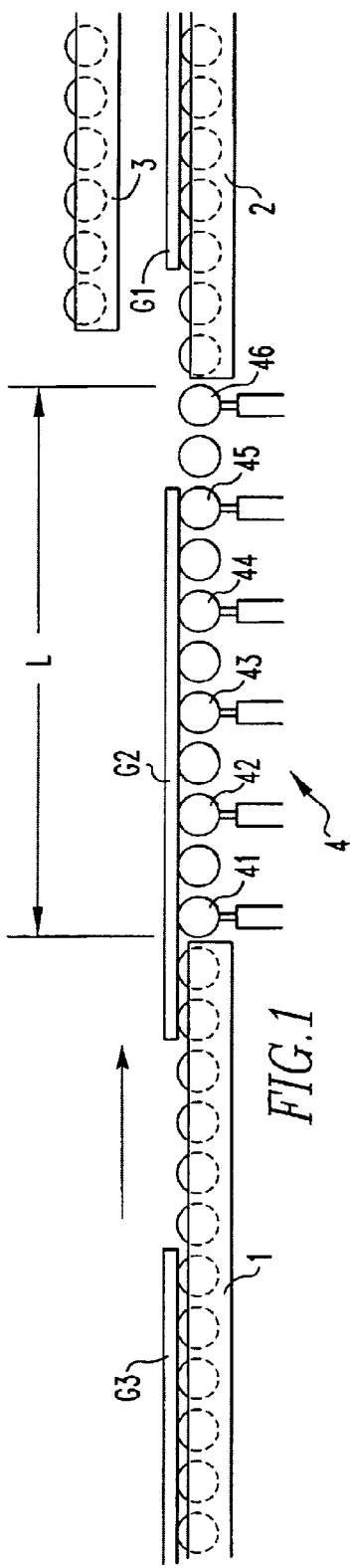
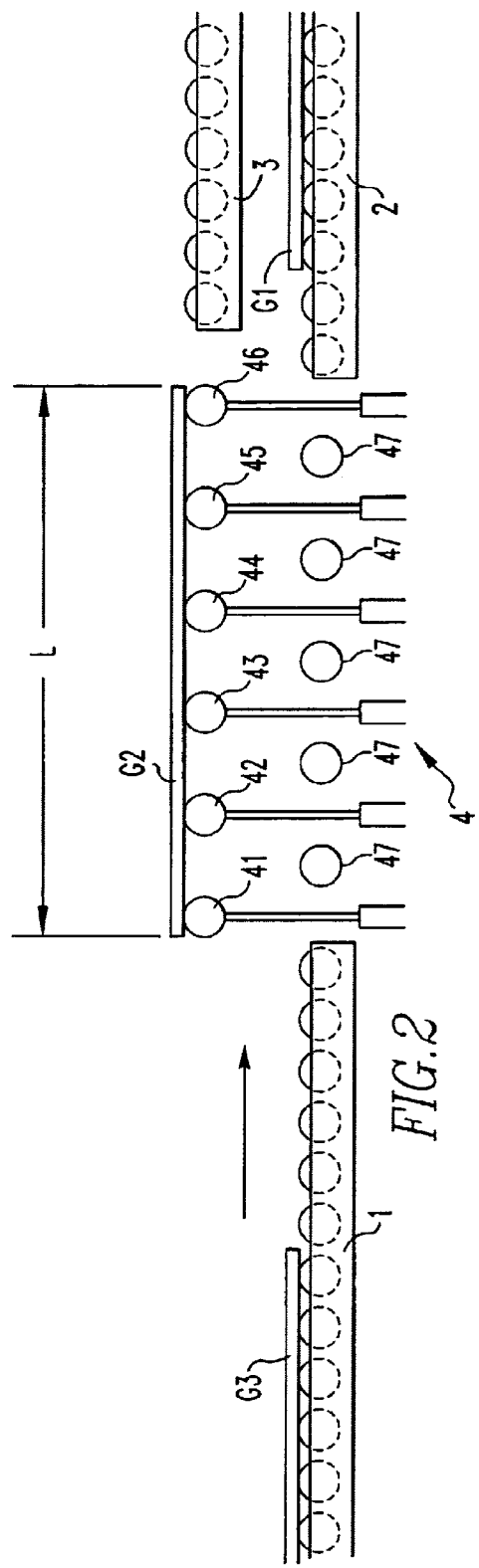

TRANSPORT DIVERTER FOR PLATE MATERIAL CONVEYOR, PARTICULARLY A PLATE GLASS CONVEYOR

This is a Continuation-In-Part Application of International application PCT/DE01/04057 filed Oct. 30, 2001 and claiming priority of German application 100 53 852.5 filed Oct. 30, 2000.

BACKGROUND OF THE INVENTION

The invention relates to a transport diverter for a conveyor for transporting plate material, particularly a roller conveyor. The invention is suitable especially for a flat glass conveyor. However, the invention may also be used in connection with conveyors for other plate materials for example, in the construction field, in the manufacture of dry wall sheets, which are manufactured, like flat glass, on a production line as a continuous plate strip, which is then cut into individual sheets.

During the production of flat glass, the glass from the furnace reaches a conveyor as a continuous strip, which is moved away by the conveyor at a predetermined speed synchronously with the manufacture of the glass strip at the furnace exit. From the point on where the glass strip is sufficiently cooled so as to be sufficiently rigid, the conveyor is a roller conveyor. Along the conveyor, in synchronism with the movement of the glass strip, the glass is optically examined for defects such as enclosures, bubbles, etc., and the defects are marked. The glass strip is cut transversely into different formats generally under the control of a computer and the glass panels cut from the glass strip may also be provided with longitudinal slits. The conveyor includes acceleration sections whereby spaces are formed on the conveyor between subsequent glass panels formed by the transverse cutting.

Subsequently, the flow of the glass panels, which have been cut in transverse direction and provided with slits in a longitudinal direction into different formats so as to eliminate defective areas in an optimal manner and which are therefore on the conveyor as a flow of mixed glass panel formats, is separated onto different conveyor branches by transport or conveyor diverters in order to facilitate the stacking of the glass plates by format sizes. Such transport diverters switch between a first conveyor branch disposed in the plane of the conveyor supplying the glass plates and a second conveyor branch disposed above the first conveyor branch in parallel relationship therewith since the travel direction cannot be changed because of the continuous glass plate flow.

In known glass production lines, such transport diverters are conveyor sections of roller conveyors which are movable between a horizontal operating position in which the arriving glass plates are moved onto the first conveyor branch disposed in the same plane and a ramp-like position in which the conveyor section is inclined from the upstream end of the conveyor section, such that the glass plates are diverted onto the upper second conveyor branch.

However, these known transport diverters in conventional glass production lines are not free of problems. For one, the glass plates move at a substantial speed of about 1 m/sec and the change of direction from the horizontal to the ramp-like raised transport diverter section results in hard impacts at the front edge of an arriving glass plate. And, upon tilting back the ramp-like, raised diverter section to the first transport conveyor branch, which extends in horizontal alignment with the supply conveyer, the glass plate is again subjected to stresses by hitting the horizontal first conveyor branch. As a result, the glass plates may break. The chances of breakage are increased by the fact that the arriving and diverted glass plates are already longitudinally slit so that undesirable breakage may occur particularly in this area. Another problem resides in the fact that the transport diverter section has to have a certain length because its inclination in the ramp-like position thereof is limited and a switchover between the two positions of the transport diverter section is only possible when a glass plate being diverted has left the transport diverter section. This is particularly true for the raising of the transport diverter section into the ramp-like position. Taking into account the time required for the switchover of the transport diverter section, the distance between subsequent glass plates on the conveyor must be greater than the length of the transport diverter section.

It is the object of the present invention to provide an improved transport diverter which avoids the two main problems of conventional transport diverters mentioned above that is the impact on the glass plates and consequently, the chances of damage or breakage and which permits shorter distances between subsequent glass plates on the conveyor than can be allowed with conventional transport diverters. The object is equally applicable to transport diverters for plate materials other than plate glass, for example dry wall plates which are mechanically sensitive and which encounter similar problems during movement on a conveyor.

SUMMARY OF THE INVENTION

In a transport diverter for diverting plate material from a supply conveyer to take-off conveyor branches, the transport diverter comprises a series of short conveyor segments, which can be raised in unison for the transfer of a plate from the supply conveyor to a conveyor takeoff branch, which extends at a higher level than the supply conveyer, and which can subsequently be lowered individually one after the other to the level of the supply conveyor as the plate moves off the conveyor segments.

An embodiment of the invention will be described below with reference to the accompanying drawings

BRIEF DESCRIPTION OF THE DRAWINGS

FIG. 1 is a side view of a flat glass conveyor with a transport diverter in one operating position, FIG. 2 shows the arrangement of FIG. 1 with a transport diverter in the other operating position.

DESCRIPTION OF A PREFERRED EMBODIMENT

Figure 3A:
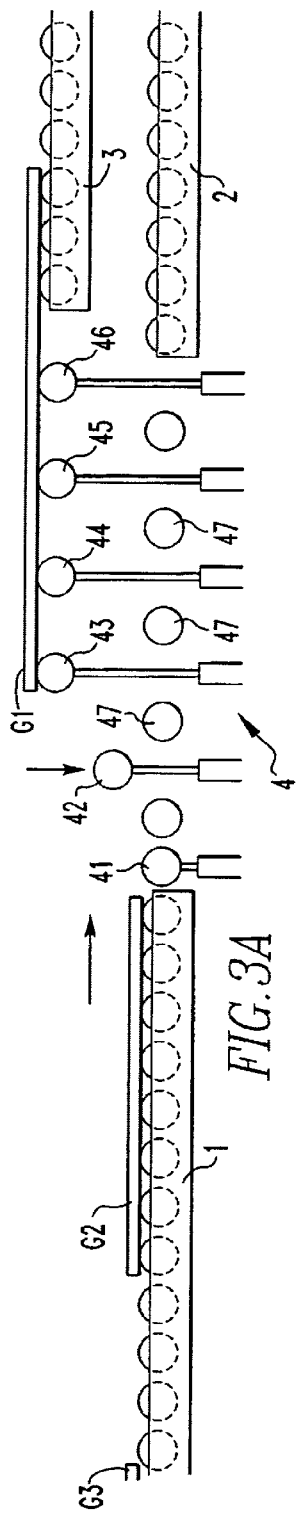
FIGS. 3A to 3C show the arrangement in subsequent phases during the return of the transport diverter from the operating position according to FIG. 2 to the operating position according to FIG. 1.

The drawings are schematic and are only intended to clarify the concept of the invention.

The drawings show a flat glass conveyor portion in a side view, including a supply conveyor 1, a first take-off branch 2 disposed in the same plane as the supply conveyor 1 and a second takeoff branch 3 which is disposed above, and parallel with, the first takeoff branch 2. The two takeoff branches 2 and 3 are in alignment with the supply conveyor 1 and with a transport diverter section 4 disposed between the supply conveyor 1 and the takeoff branches 2 and 3. Also, three glass plates G1, G2, G3 are shown in the drawings, in order to clearly show the operation of the transport diverter. The glass plate G1 has been transferred to the lower takeoff branch 2, the following glass plate G2 is to be transferred to the upper takeoff branch 3 and the subsequent glass plate G3 again is to be transferred to the lower takeoff branch 2.

FIG. 1 shows the supply conveyor 1 with the transport diverter section 4 in an operating position in which it interconnects the supply conveyor 1 with the lower takeoff branch 2, which is disposed in the same plane as the supply conveyor 1. As it can be clearly seen, the distances between the subsequent glass plates G1, G2, and G3 are substantially smaller than the length L of the transport diverter section 4. The transport direction is marked by an arrow. The frontmost glass plate G1 has already left the transport diverter section 4 and moved onto the lower takeoff branch 2. The following glass plate G2 is already partially on the transport diverter 4; it is followed by the next glass plate G3, which is on the supply conveyor 1.

FIG. 2 shows the transport diverter section 4 in the other operating position in which the second glass plate G2, while remaining in a horizontal position, is raised to the level of the upper takeoff branch 3 and is advanced onto the upper takeoff branch 3.

From FIG. 2 also the design of the transport diverter section 4 is apparent. It consists of a number of successive short roller transport segments 41, 42, 43, 44, 45, 46, which are symbolically represented in the figures each by a transport roller and which can be moved individually and independently from each other between the lower position (FIG. 1) and the upper position (FIG. 2). As indicated in the drawings, the vertically movable transport diverter segments 41 to 46 may be arranged alternately with short stationary transport roller sections 47 or they may be arranged directly adjacent one another. They include each driven transport rollers, so that a glass plate disposed on the transport diverter, that is, in this case, the glass plate G2 is moved continuously also during the raising of the transport diverter segments.

The raising and lowering of the transport diverter segments 41 to 46 occurs under the control of a computer synchronously with the transport of the glass plates on the conveyor and, depending on the conditions, under consideration of the individual glass plates, that is, the lengths thereof in the transport direction.

The transport diverter segents 41 to 46 are raised concurrently and synchronously as soon as the respective glass plate G2 is disposed mostly or sufficiently far on the transport diverter section to permit a respective diverter segment to be raised.

Figure 3B:
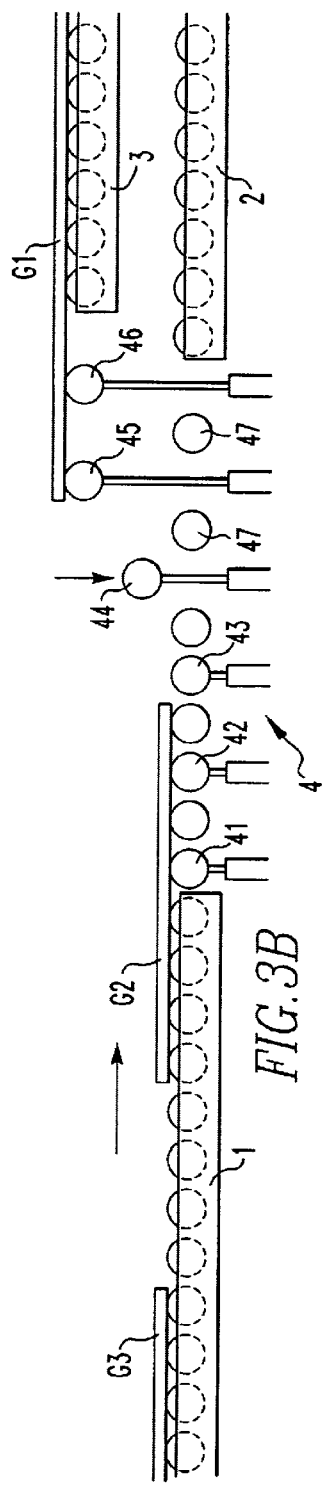
Figure 3C:
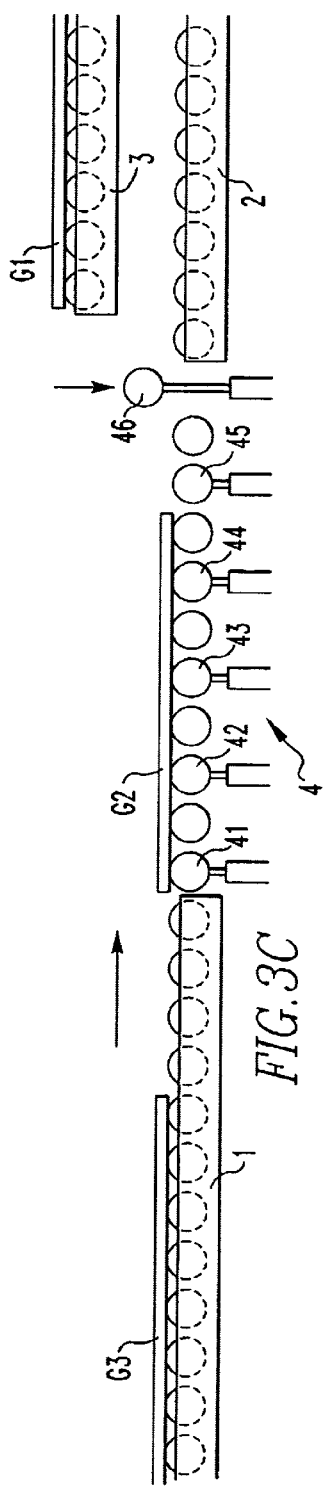

The lowering of the transport diverter segments however does not occur concurrently, but in a staggered fashion, that is, one segment after the other is lowered in synchronism with the advance of the glass plate G2 supported by the transport diverter segments: As soon as the rear edge of the respective glass plate has left the respective transport diverter segment, the transport diverter segment is lowered to its lower position. FIGS. 3A to 3C show, in a flash-like fashion, three phases of the return procedure of the transport diverter segments to their lower positions during the advance of the glass plates on the conveyor. From FIGS. 3B and 3C, it can be seen how the succeeding glass plate G2 already moves onto the transport diverter section while the takeoff of the glass plate G1 from the transport diverter segments onto the upper takeoff section 3 is still in progress.

With the transport diverter according to the invention, a material flow distribution to three takeoff branches could easily be realized by arranging two takeoff branches in two levels above the takeoff branch, which is in alignment with the supply conveyor. This would not be possible with conventional transport diverters including ramp switching arrangements. It would furthermore be possible to arrange another takeoff branch below the takeoff branch, which is in alignment, and level, with the supply conveyor.

What is claimed is:

1. A transport diverter for plate material conveyors, including a supply conveyor for supplying a plate material flow, at least two takeoff conveyor branches which are arranged in the transport direction in alignment with the supply conveyor and of which one is disposed at the same level as the supply conveyor and the other takeoff conveyor branch is disposed at a higher level, a transport diverter section arranged between said supply conveyor and said takeoff conveyer branches, said transport diverter section being formed by a plurality of short transport diverter segments, which are individually movable between the level of the supply conveyor and the level of the second takeoff conveyor branch, said transport diverter segments being movable in unison and synchronously for the transfer of a plate from the supply conveyor to the second takeoff conveyor branch, which is disposed at a higher level than said supply conveyer, and said transport diverter segments being movable to be lowered to the level of the supply conveyor in succession individually and synchronously with the movement of said plate onto said higher-level second takeoff conveyor branch.

* * * * *